US008745154B1

(12) United States Patent
Froment et al.

(10) Patent No.: US 8,745,154 B1
(45) Date of Patent: Jun. 3, 2014

(54) ITEM DOWNLOAD CUSTOMIZATION (75) Inventors: Arnaud Froment, San Jose, CA (US); Kenneth P. Kiraly, Menlo Park, CA (US)

(73) Assignee: Amazon Technologies, Inc., Reno, NV (US)

(*) Notice: Subject to any disclaimer, the term of this patent is extended or adjusted under 35 U.S.C. 154(b) by 421 days.

(21) Appl. No.: 12/862,592

(22) Filed: Aug. 24, 2010

(51) Int. Cl.
*G06F 15/16* (2006.01)
*H04L 29/08* (2006.01)
*H04H 60/35* (2008.01)

(52) U.S. Cl.
CPC .............. H04L 67/306 (2013.01); H04L 67/32 (2013.01); *H04H 60/35* (2013.01)
USPC ........................................................ 709/217

(58) Field of Classification Search
CPC ...... H04L 67/306; H04L 67/32; H04H 60/35; H04H 60/06
USPC ................................................................ 709/217
See application file for complete search history.

(56) References Cited

U.S. PATENT DOCUMENTS 6,088,722 A * 7/2000 Herz et al. ................. 709/217
7,787,818 B2 * 8/2010 Shapiro et al. ............. 455/3.01
2004/0001087 A1 * 1/2004 Warmus et al. ............ 345/745
2007/0199076 A1 8/2007 Rensin et al.
2007/0204003 A1 * 8/2007 Abramson ................. 709/217
2009/0030778 A1 1/2009 Zapata et al.
2009/0076749 A1 3/2009 Nasle
2010/0332301 A1 12/2010 Higgins et al.

OTHER PUBLICATIONS

Office Action for U.S. Appl. No. 12/862,547, mailed on Sep. 20, 2012, Froment et al., "Multi-Source Profiling for Adaptive Device Operation", 11 pages.

* cited by examiner

*Primary Examiner* — Asghar Bilgrami
(74) *Attorney, Agent, or Firm* — Lee & Hayes, PLLC (57) ABSTRACT

A client device may include various sensors that monitor an environment of the client device as well as operations performed by the client device. The client device may identify a digital item that a user has requested to download to the client device according to a predetermined schedule that includes multiple reoccurring periods. The client device may monitor access of the item (or versions thereof) by the user for each of the multiple reoccurring periods of the predetermined schedule. The client device may then determine that the user does not access the item during at least one instance of a particular period of the multiple reoccurring periods. Based at least in part on the determining, the client device may refrain from downloading the item to the client device during an instance of the particular period that is subsequent to the at least one instance of the particular period.

25 Claims, 10 Drawing Sheets

ITEM DOWNLOAD CUSTOMIZATION

BACKGROUND

The first generation of electronic devices included devices that typically included a single mode of operation. For example, a simple calculator operates the same regardless of a user or a history of use. Over time and with the introduction of more sophisticated software, users have gradually been able to customize electronic devices to adjust functionality based on user preferences. Users can save a profile, change user settings, and otherwise customize an electronic device based on one's own preferences. For example, on a personal computer, a user can select wallpaper for a background display, select a default font size, and so forth. However, each of these changes takes time and effort and typically has to be performed manually by the user.

An important factor when controlling an electronic device is an efficient use of resources, such as batteries and processors and the user's own time. For example, many devices include a timeout mode or sleep setting, that take effect after a predetermined amount of time to reduce a drain on a battery. Processor power may be unnecessarily consumed when running needless tasks or performing tasks during an inappropriate time, which may negatively impact a user's experience by slowing a response time of the electronic device. For example, when a software update is run while a user is operating the device rather than after the user finishes using the device, this update potentially wastes some processing power that could otherwise be dedicated to expediting requests from the user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

A client device, as disclosed herein, may include various sensors that monitor an environment of the client device as well as operations performed by the client device. The sensors may store data that, when analyzed and compared to past events and patterns, may be used to identify a current user of the client device. In some embodiments, the data may be used to determine a context of operation of the client device, which may enable the client device to adapt in real-time or to predict future behavior of the user and then adjust control settings of the client device accordingly. As discussed herein, a client device is any electronic device capable of running customizable software and/or software that can otherwise adapt to events and/or user interaction.

In accordance with various embodiments, the client device may track user activity associated with multiple users over a period of time. After a threshold amount of data has been received from various sensors and associated with the users, the client device may be able to determine which user is operating the device based on the context of the use. For instance, when a first user predominantly uses the device to access a set of information or to execute an application (i.e., the context), the client device may identify the particular user from other users when the respective application is used and/or the information is accessed by the client device. In the context of an electronic book (eBook) reader, the set of information may be a subscription to a particular magazine, type of book, or source of media.

Once the client device identifies the user, the client device may adapt in real-time by adjusting settings of the client device and/or interface in accordance with determined preferences of the identified user. For example, the settings may include an adjustment to a default volume, a font size and/or type, screen brightness, or other types of settings. The client device may further consider a context of operation of the client device in addition to the user and adapt accordingly (e.g., used in a moving vehicle by the first user, thus increase volume and font size).

Further, the client device may predict future behavior and then adjust control settings of the client device accordingly. In some instances, the client device may selectively download content for the user for the days the user typically uses the content rather than for every occurrence of the content. For example, when the user has a subscription to an electronic newspaper that is downloaded by the client device as a background task, the client device may only perform the download for the electronic newspaper on the days the user typically reads the electronic newspaper based on user history.

The techniques and systems described herein may be implemented in a number of ways. Example implementations are provided below with reference to the following figures.

Illustrative Environment and System

Figure 1:
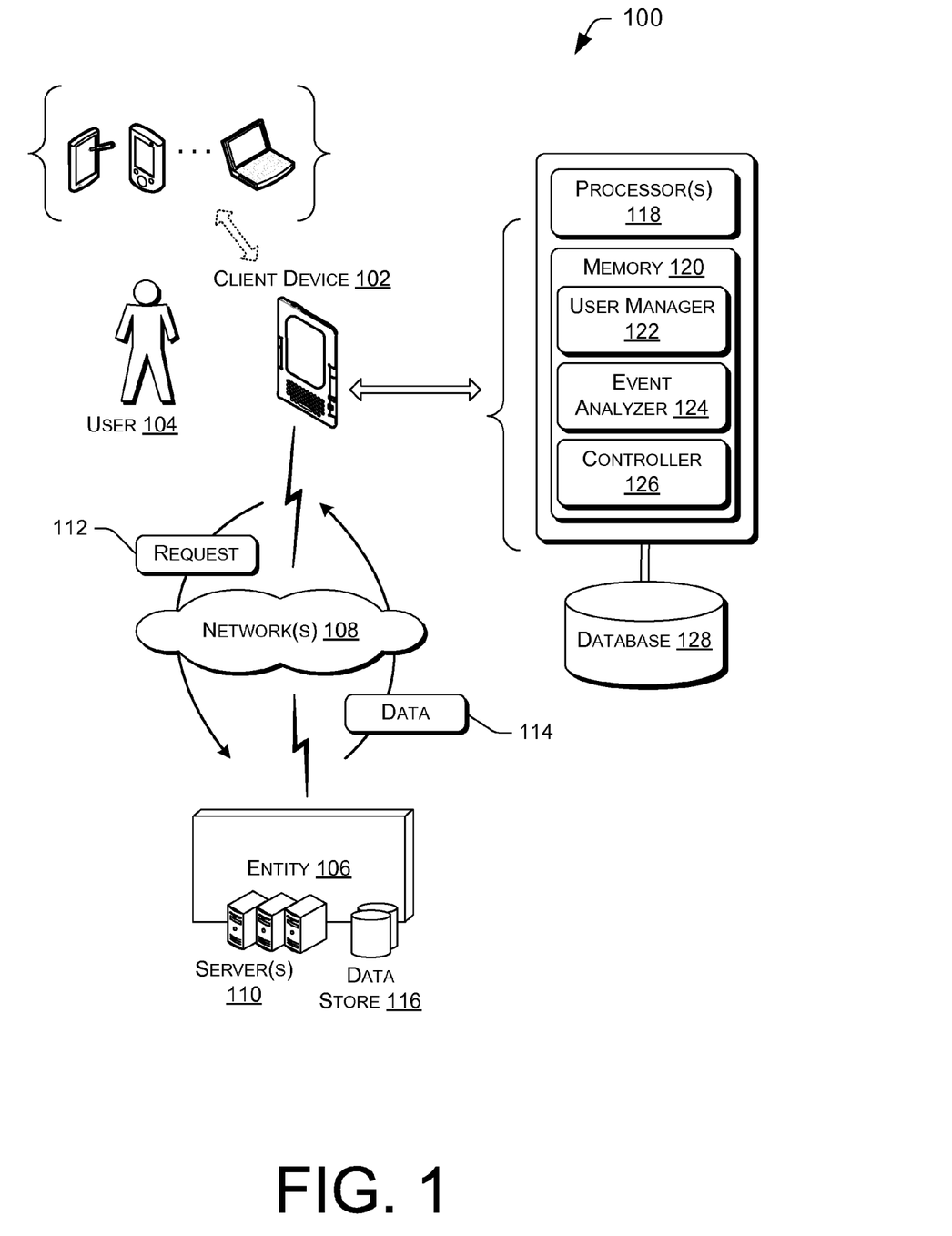
FIG. 1 is a schematic diagram of an illustrative environment usable to provide multi-source profiling to adapt an operation of a client device for an event and/or a user.

FIG. 1 is a schematic diagram of an illustrative environment usable to provide multi-source profiling to adapt an operation of a client device for an event and/or a user. In accordance with one or more embodiments, the environment 100 may include a client device 102 that performs operations in response to inputs from a user 104. The client device 102 may be a personal computer, an electronic book (eBook) reader device, a tablet computer, a mobile telephone (including smartphones), a personal digital assistant (PDA), a television, a set top box, a gaming console, or another electronic device. The client device 102 may be configured to provide various outputs, such as a visual display, sound, haptic feedback, and so forth for content that may include text, still images, and moving images, including interactive applications.

In some embodiments, the client device 102 may communicate with an entity 106 via one or more network(s) 108. For example, the client device 102 may receive data from the entity 106, such as an eBook, an electronic content subscription, a movie, music, or other content form the entity 106. The entity 106 may include servers 110 to respond and fulfill a request 112 from the client device 102, such as by providing data 114 stored in a data store 116.

The client device 102 may include processor(s) 118 and memory 120. The memory 120 may store various applications, modules, and/or components to perform the various functions described herein. In some embodiments, the memory 120 may store a user manager 122, an event analyzer 124, and a controller 126, each discussed in turn.

The user manager 122 may manage user accounts and user-specific controls, settings, or other preferences of the client device 102. In some embodiments, the user manager 122 may identify a user from available user identities stored in a database 128 based on sensory data obtained by the client device. For example, the user manager 122 may identify the user controlling the client device 102 based on content accessed by the user, interactions with a touch screen (e.g., finger size), a time of usage (e.g., night, morning, etc.), a user's credentials (e.g., username, biometric data, etc.) and so forth. Once the user manager 122 identifies the user, the user manager 122 may enable monitoring of user actions (via the event analyzer 124) and/or adjustment of control settings (via the controller 126) to enhance a user experience of the user and/or conserve resources such a battery power.

The event analyzer 124 may monitor information associated with the client device 102 using various sensors and/or monitor user interaction with the device. The event analyzer 124 may accumulate information, analyze the information, and then create policies based on the information that may affect current (real-time) behavior and/or future (predictive) behavior of the client device 102. In some embodiments, the event analyzer 124 may associate the information with a user to enable cooperative operation with the user manager 122. The event analyzer 124 may store data in the database 128, either as global data (not associated with the user) or as user data in association with a user.

The controller 126 may implement information (policies) from the user manager 122 and/or the event analyzer 124, such as to implement the policies created by the event analyzer 124 across all users (global) or for a particular user or set of users (user-specific).

Figure 2:
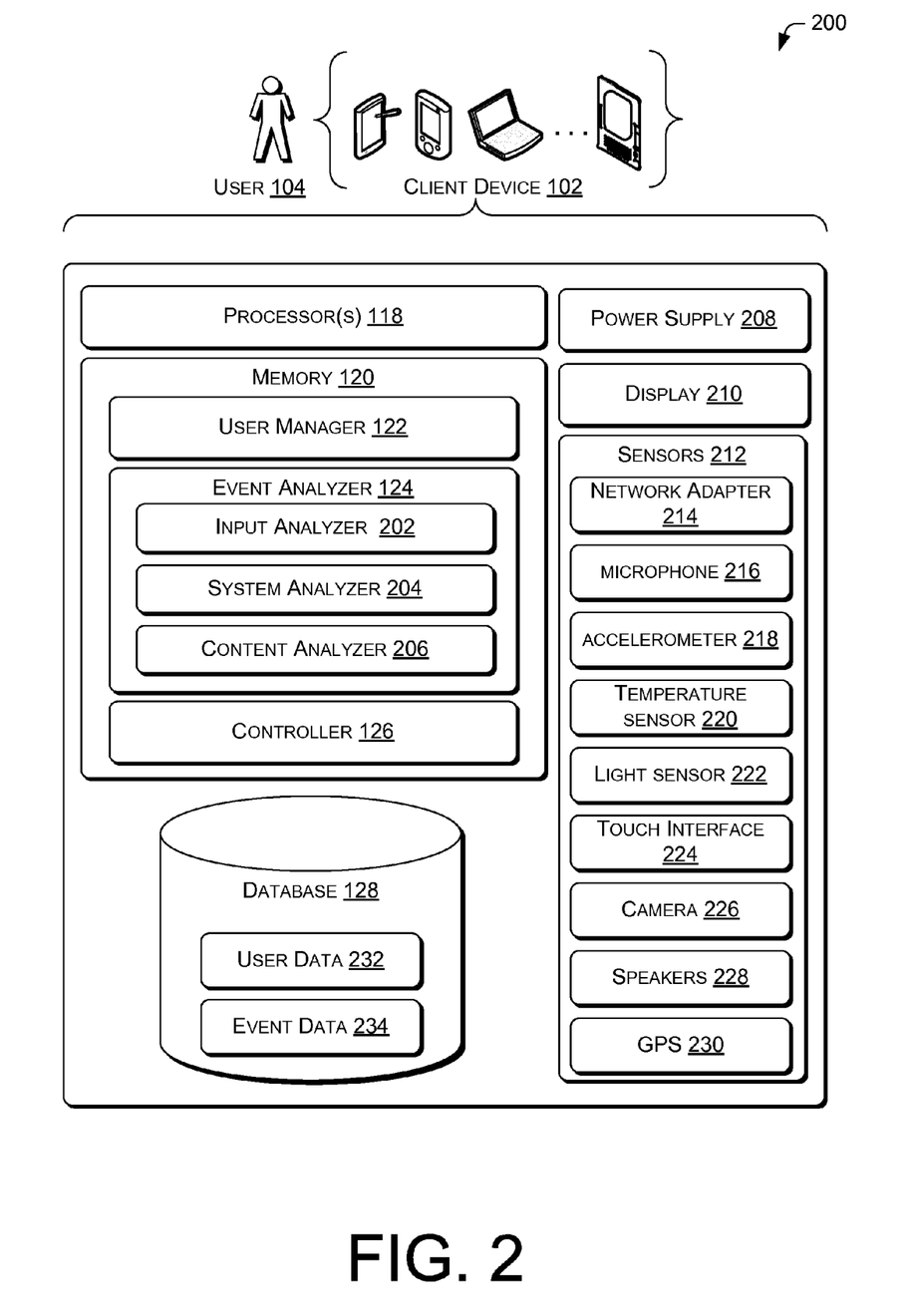
FIG. 2 is a block diagram of an illustrative computing system used to perform the multi-source profiling.

FIG. 2 is a block diagram of an illustrative computing system 200 used to perform the multi-source profiling as described in FIG. 1 The computing system 200 may include the processor(s) 118, memory 120, along with the various applications, modules, and components described above. In some embodiments, the event analyzer 124 may include submodules of an input analysis module 202, a system analyzer 204, and a content analyzer 206, which are described in turn.

The input analyzer 202 may monitor and analyze user inputs received by the client device 102. For example, the input analyzer 202 may determine a size of a finger of a particular user based on touch-inputs by the user. In another example, the input analyzer 202 may analyze user preferences for particular events, such as a volume setting a user desires while listening to music and traveling in a vehicle.

The system analyzer 204 may analyze the operations of the client device 120 (the system). For example, the system analyzer 204 may monitor battery power (energy consumption), network activity, processing workloads, and other system-level tasks during interaction with the user. The controller 126 may implement controls based on information collected by the system analyzer 204 to conserve power, reduce processing workload, or otherwise enhance the system operation.

The content analyzer 206 may analyze content accessed by the client device 102. For example, the content analyzer 206 may identify trends of a user, such as applications and/or data accessed by the user during different periods of time.

In accordance with various embodiments, the client device 102 may include a power supply 208, such as one or more batteries, which provide power available for consumption by the various physical components of the client device, such as the processor(s) 118 and a display 210. In addition, the client device 102 may include various sensors 212. The sensors 212 may have other primary or secondary operations in addition to sensing and monitoring user activity and events associated with the client device 102 (the context of use). In various embodiments, the sensors 212 may include a network adapter 214, a microphone 216, an accelerometer 218, a temperature sensor 220, a light sensor 222, a touch interface 224, a camera 226 (or motion detector), speakers 228, and/or a Global Positioning System (GPS) 230. Each of the sensors 212 may be used by the user manager 122 and/or the event analyzer 124 to monitor user activity and events associated with the client device 102. In addition, the client device 102 may include or otherwise have access to a database 128 for storing user data 232 and event data 234. A select portion of the sensors 212 are described next by way of scenarios that further describe monitoring capabilities that may be under control of the user manager 122 and/or the event analyzer 124.

Scenario 1: Dad is in a Moving Vehicle

The event analyzer 124 may monitor an environment during use of the client device 102, or following a power up, by way of the sensors 212. When the client device 102 is being used in a moving vehicle, for instance, the microphone 216 may detect a high level of ambient noise caused by the vehicle, road, etc. The accelerometer 218 may detect bumps and continuous movement within the vehicle. The GPS 230 may detect movement of the client device 102. By receiving some or all of this data from the various sensors 212, the event analyzer 124 may deduce that the user is traveling in a vehicle. In some embodiments, the deduction of the context "in a moving vehicle" may be based on learned data (training data) obtained by the event analyzer 124. However, in various embodiments, some contexts may be preprogram for identification based on known events, such as riding in a vehicle, reading in a quiet place (e.g., home, library, etc.) and so forth.

The user manager 122 may determine using data from the input analyzer 202 that the user is "dad." For example, the touch interface may detect a large fingerprint, palm identification (via palm rejection software), or touch pressure that is associated with dad. The camera 226 (proximity detector) may also indicate that the user is dad based on a position of the client device 102 relative to the user. Further, the accelerometer 218 may determine the device's attitude (position in space) is associated with dad's use of the client device 102, and so forth. Some or all of these sensed events (other contexts) may be used to deduce that the user is dad.

The event analyzer 124 may include the event data 234 that, when analyzed over time, results in a trend where dad increases a font size and volume of the speakers 228 when reading in a moving vehicle. Accordingly, the controller 126 may proactively increase a font size and volume of the speakers 228 upon detection of the context of the moving vehicle and the user being dad, and without further inputs by the user. In some instances, some actions of the controller 126 may not be based on the event data 234, such as the increase in font size, but due to known trends, preferences, or other known information for a particular context. For example, the device may power down the network adapter 214 when the device detects that it is on an airplane that is ready for takeoff regardless of the user operating the device.

Scenario 2: Mom Reading at Night

The event analyzer 124 may monitor an environment during use of the client device 102 by way of the sensors 212. The accelerometer 218 may detect little or no movement of the client device 102 and a particular attitude of the client device. Further, the network adapter 214 may detect a signal from a home network. The system analyzer 204, which may track time on the client device 102, may determine a time as being late evening. The light sensor 222 may detect a low level of light. By aggregating some or all of this information, the event analyzer 124 may determine the context is use of the client device 102 late at night for reading a document.

The user manager 122, via the content analyzer 206, may determine the user is mom based on a type of content that is accessed by the user. For example, the document (e.g., eBook) may have been purchased by mom, of a genre preferred by mom, or by other data that may link the content to the user "mom."

The event analyzer 124 may include the event data 234 that shows that mom often mutes the speakers 228 and increases the brightness of the display (that may already include auto-dimming). Accordingly, the controller 126 may proactively mute the volume of the speakers 228 and increase a brightness of the display relative to default brightness upon detection of the context of reading at night by mom, and without further inputs by the user.

Figure 3:
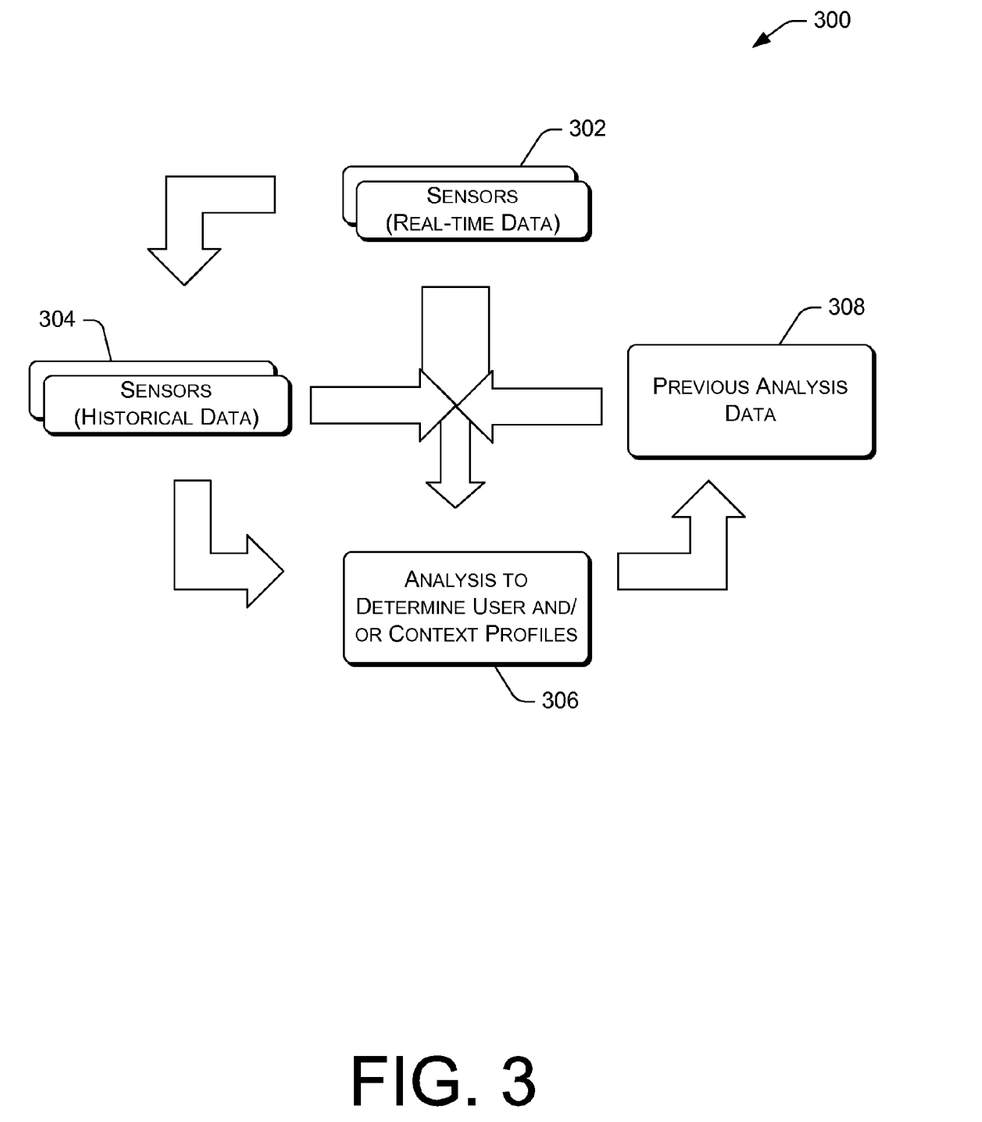
FIG. 3 is a block diagram of an illustrative feedback cycle to collect information from sensors and use the information to adapt an operation of a client device based on an event and/or a user.

FIG. 3 is a block diagram of an illustrative feedback cycle 300 to collect information from the sensors 212 and use the information to adapt an operation of the client device 102 based on an event and/or a user.

At 302, the sensors 212 may record real-time data, such as a current state of the client device 102. As time passes, the event analyzer 124 may retain some of the sensor information at 304 to add a historical context to the data. The data from the sensors 212 may be stored in the event data 234 and used for real-time adjustments by the controller 126 of the client device 102 and/or for later use.

A 306, the user manager 122 and the event analyzer 124 may use the sensor data at 302 and 304 to determine a user and/or context profile (what is happening with the client device 102). For example, at 306, the event analyzer 124 may determine the event of being in a moving vehicle, reading at night, or being in an aircraft ready for departure. Further, at 306, the user manager 122 may determine a user of the device based on the sensor data at 302 and/or 304.

At 308, the event analyzer 124 may store previous analysis data and use the previous analysis data to instruct the controller 126 to perform operations. For example, the previous analysis may determine that the user "dad" usually turns up the volume of the speakers 228 and increase a font size when using the client device 102 in a moving vehicle. Thus, when a current context at 306 is mapped to a previous context from 308, the event analyzer 124 may determine to increase a size of the font and a volume of the speakers 228 proactively without relying on the user "dad" to perform manual adjustments to achieve the same ends. Thus, the illustrative feedback cycle 300 shows an adaptive cycle of monitoring the use and context of the client device 102 using the sensors at 302, which is stored at 304, and used to generate information, which may be used for real-time adjustments at 306 or for determining a policy for a future action based on analyzed trends of the user at 308.

Illustrative Operation

Figure 4:
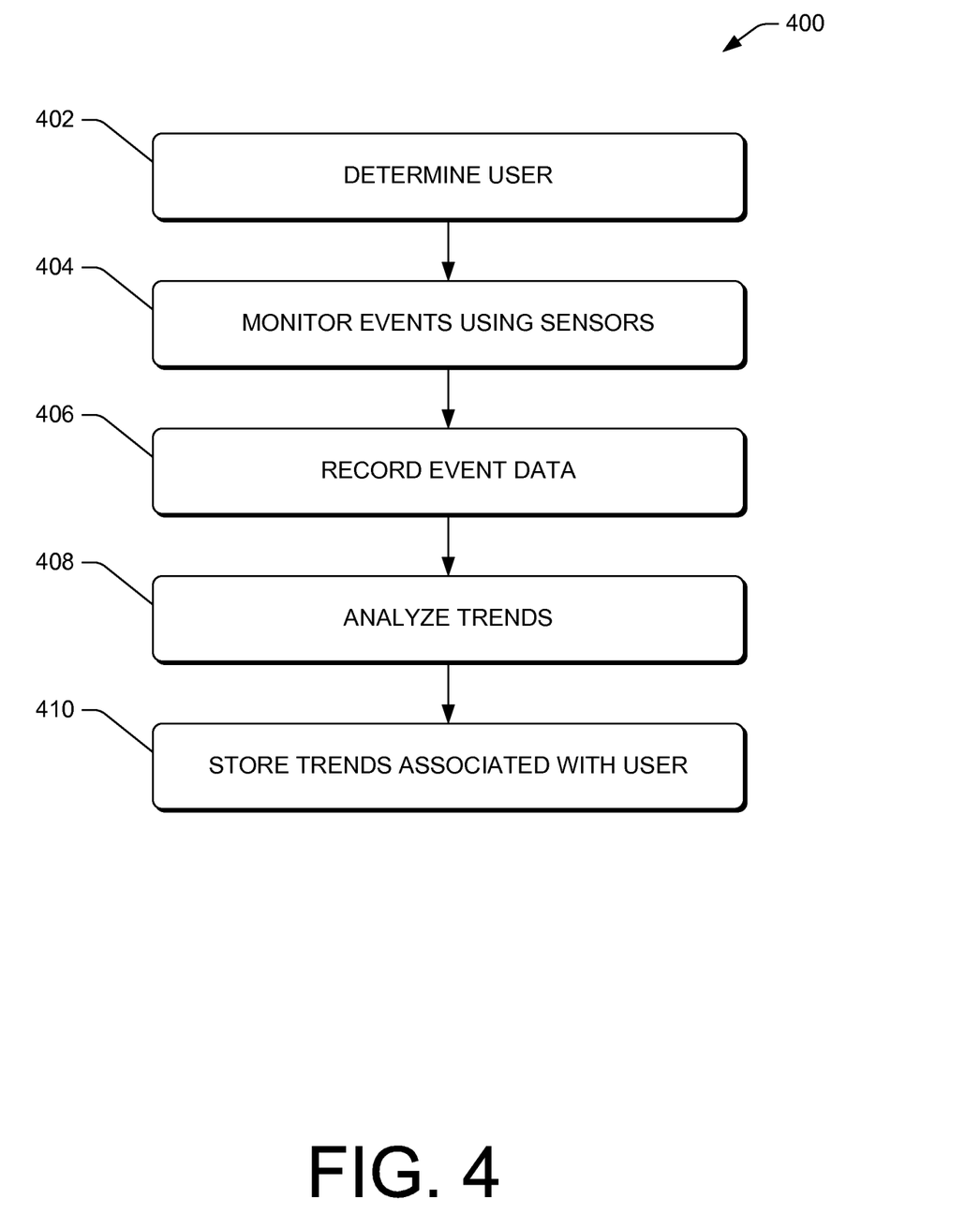
FIG. 4 is a flow diagram of an illustrative process to train a client device by monitoring an environment and/or user interaction with a client device.

FIG. 4 is a flow diagram of an illustrative process 400 to train a client device by monitoring an environment and/or user interaction with the client device 102. The process 400 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The process 400 is described with continued reference to FIGS. 1 and 2. Other processes described throughout this disclosure, in addition to process 400, shall be interpreted accordingly as to the preceding terms.

In accordance with various embodiments, the process 400 may train the client device 102 to accumulate data (e.g., the event data 234 and/or the user data 232) for use by the event analyzer 124 and the user manager 122 to enable multi-source profiling to adapt an operation of the client device 102 for an event and/or a user At 402, the user manager 122 may determine that a user is operating or interacting with the client device 102. For example, the user manager 122 may present a dialog box, login field, or other option to enable the user to sign or log in to a user account stored in the user data 232. As the client device learns (is trained), the user may be automatically identified as discussed herein.

At 404, event analyzer 124 may monitor events using the various sensors 212. For example, the event analyzer 124 may selectively monitor data that has known trends associated with the user or events performed by the user. For example, the event analyzer 124 may determine that the client device 102 is used by the user "dad" and may determine different contexts where dad increases or decreases a volume, changes a brightness of the display, or takes other actions with the client device 102.

At 406, the event analyzer 124 may record the event data 234. The event analyzer 124 may associate some or all of the event data 234 with the user. In this way, some or all of the event data 234 may be referenced to respective users and the user data 232.

At 408, the event analyzer 408 may analyze trends form the recorded event data from the operation 406. For example, the event analyzer 408 may determine that a first user "mom" often uses the client device 102 late at night while a second user "dad" often uses the client device 102 sporadically during the weekends and sometimes during the week. Further, the event analyzer 124, via the context analyzer 206, may determine types of content preferred by each of the users, user settings based on various events (e.g., volume setting while in a moving vehicle, during late hours at night, etc.) using the system analyzer 204, and so forth.

At 410, the event analyzer 410 may store the analyzed (compiled) trends as the event data 234 associated with the user data 232. The event data 234, while used with or without the user data 232, may promote policies that enable the controller 126 to provide a dynamic user experience by adjusting operation of the client device in a real-time mode or predict future actions, and thus direct the controller 126 to operate accordingly.

Figure 5:
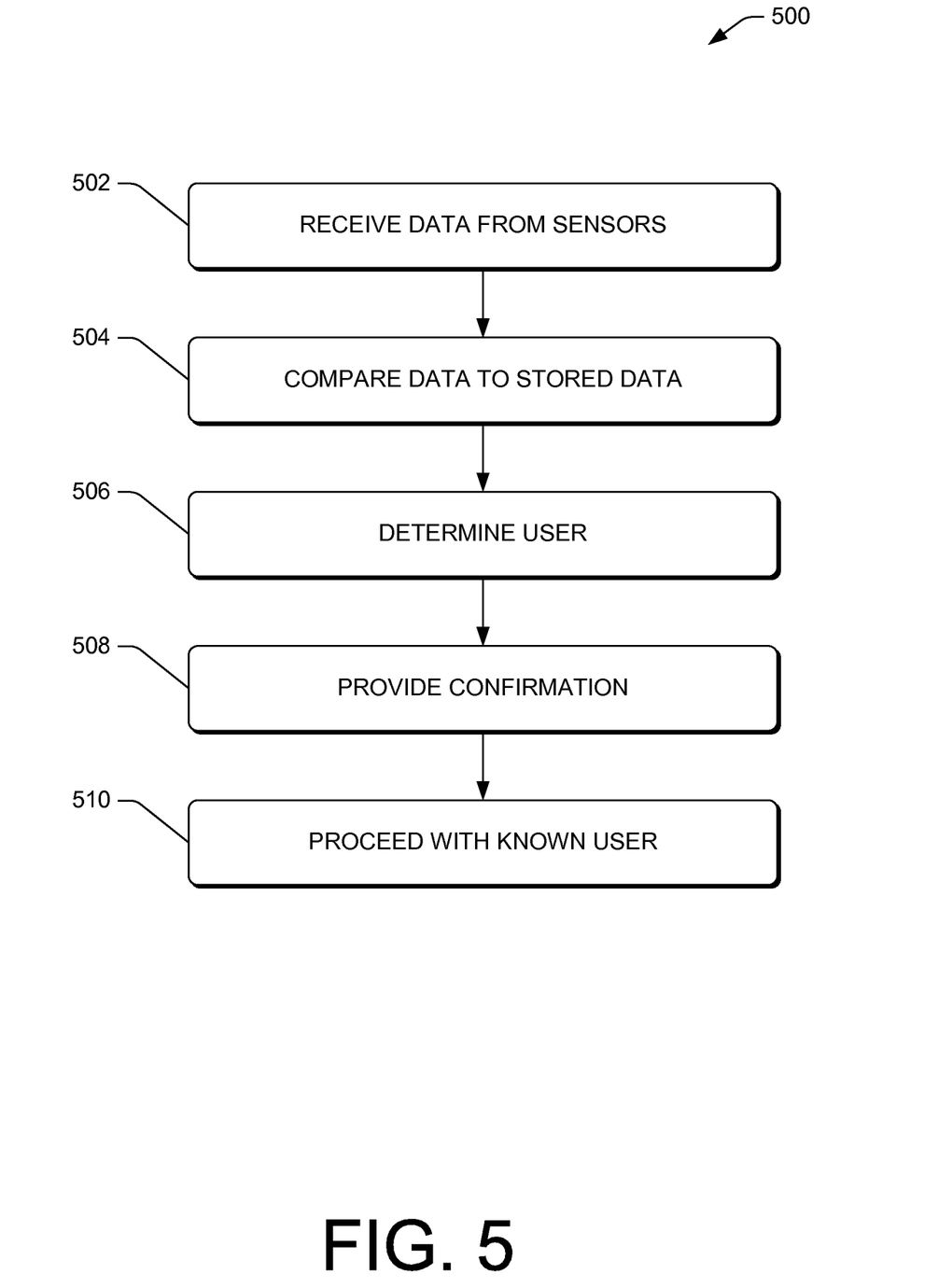
FIG. 5 is a flow diagram of an illustrative process to identify a user that operates the client device based on the monitored data from various sensors.

FIG. 5 is a flow diagram of an illustrative process 500 to identify a user that operates the client device 102 based on the monitored data from at least some of the sensors 212.

At 502, the event analyzer 124, such as via the input analyzer 202, may receive data from the sensors 212. The data may include data from the touch interface 224, the accelerometer 218, or any of the other sensors 212. Further, the data may be from an analysis performed by the content analyzer 206 that analyzes actions of the controller 126. For example, the content analyzer 206 may determine which content is accessed by the client device 102 (e.g., genre of music, source of eBook, etc.).

At 504, the event analyzer 124 may compare the data to the event data 234 and/or the user data 232. By comparing the data, the event analyzer 124 attempts to map a sensed current condition with known data. For example, the event analyzer 124 may collect data and analyze the data to determine the content being read on the client device 102 is a romance novel. This data may then be mapped to historical data that shows that only the user "mom" accesses the romance novels on the client device.

At 506, the user manager 122 may determine which user is operating and/or interacting with the client device 102. In some embodiments, the user manager 122 may provide a confirmation or indicator of the user at 508. For example, the user manager 122 may request that the user verify their identity after the determination. As another example, the user manager 122 may present the user's name, associated symbol, wallpaper, auditory signal, or other indicator to the user, such as via an identifier in a corner of the display 210, and thus not require further input unless necessary. In some embodiments, the user manager 122 may provide an indicator to show that the identification has occurred, such as by displaying a symbol or other type of indicator. At 510, the controller 126 may perform operations using the known user, which may use data from the user data 232 and/or the event data 234.

Although the user may be identified using many different techniques by extracting data from the sensors 212, a non-exhaustive list of examples is discussed to further illustrate the process 500. In some embodiments, proximity sensors (e.g., the camera 226) may determine the user based on how close the client device 102 is held to the user's body (e.g., mom may have shorter arms or better near-sight vision). A size of an area from a touch event on the touch interface 224 may indicate the user (e.g., the size of the users fingers, the pressure of the touch, size of a hand/palm via palm rejection software, etc.). A language used for the content being read may indicate the user when some users read or listen in different languages. Further the type of content (via the content analyzer 206) may indicate use by a particular user, such as types that include video, eBooks, a specific document source, genre, and so forth. In some embodiments, a combination of events may be indicative of a user, such as listening to music while accessing electronic documents.

In an environment specific to eBook readers, a non-exhaustive list of events indicative of the user may include a user's speed of reading (e.g., average page turn rate, etc.), a length of a session (reading for over an hour, etc.), usage pattern of a particular piece of content (e.g., dad reading the New York Times® on the weekends), and so forth.

Figure 6:
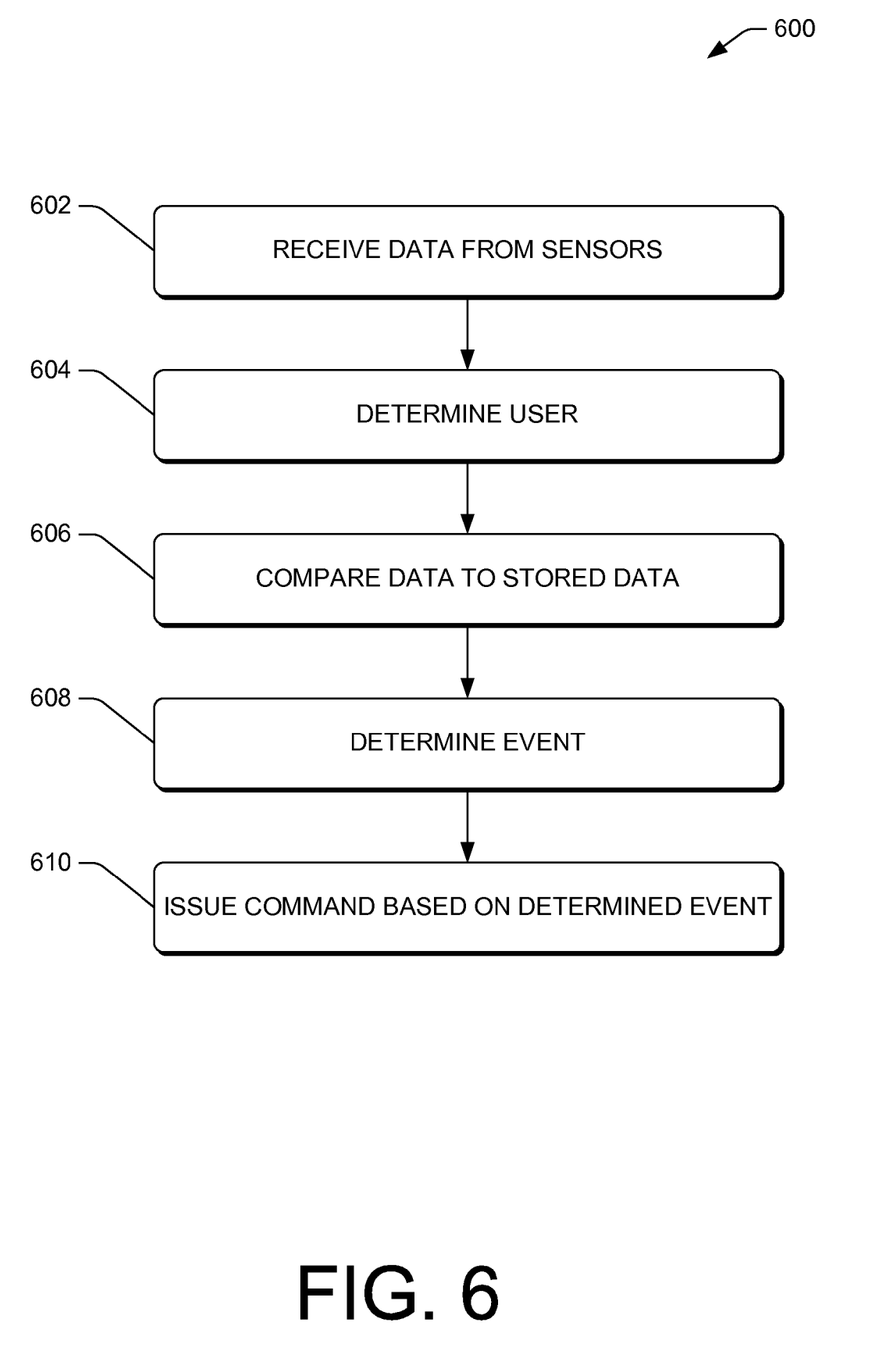
FIG. 6 is a flow diagram of an illustrative process to use event data and user information to set a policy for operation of the client device based on the monitored data from the sensors.

FIG. 6 is a flow diagram of an illustrative process 600 to use event data and user information to set a policy for operation of the client device based on the monitored data from the sensors 212.

At 602, the event analyzer 124 may receive data from the sensors 212. At 604, the user manager 122 may determine the user. In some instances, the user manager 122 may determine the user by a user sign in or other conventional user identification. However, in some embodiments, the user manager 122 may identify the user via the operations described with reference to the process 500 and thus the user may not formally sign in to the client device 102 but instead may be detected based on user activity monitored by the event analyzer 124, such as at the operation 602.

At 606, the event analyzer 124 may compare the data received at the operation 602 to stored data, such as user data 232 and/or the event data 234. The event analyzer 124 may analyze the monitored data from the sensors, which when compared to stored and analyzed event data, may indicate a context of the user of the client device. For example, when the accelerometer records little movement of the device and a temperature sensor records a hot temperature; the event analyzer may compare these parameters to the stored data to determine an event, such as using the device outside in the sun (by a pool, etc.).

The event analyzer 124 may then determine an event that is occurring in real-time or a trend that has occurred, which may warrant a change in operations (predictive operation). The example of use outside illustrates a real-time change. A predictive operation may be illustrated by monitored events that indicate that a user does not use the network adapter while outside on a hot day, and thus the network adapter is predicatively disabled despite a possible lack of affirmation of such a preference by the user.

At 610, the controller 126 may perform the command based on the determined event. For example, when the device is determined, at 608 to currently be in use outside, a backlight and network adapter may be disabled and the volume may be increased by the controller 126.

To further illustrate the process 600, a non-exhaustive list of examples is discussed next. In some embodiments, the actions may determine an event at 608 that enables the controller 126 to adjust a power management policy (or settings) to reduce power consumption of the device 102. For example, the data from the sensors may indicate that the client device 102 is used late at night and the user (at 604) is "mom." By performing the comparison at 606, the event may be determined to likely be a long usage of the client device followed by a long period of inactivity such that the device can be powered down rather than using a screen saver. This information may be based on trends from mom's usage over a period of time, such as months of usage. Thus, the controller 126 may omit running a screen saver at 610 in this identified context, and instead power down the client device 102 after a predetermined duration of inactivity, and thereby conserve power.

Further illustrative events, policy changes, and commands that may be performed by the process 600 may include an adjustment to connectivity management to minimize power consumption, data service charges, and/or increase security. For example, if a user only downloads content from a home network, then the network adapter may be powered off when the user is using the client device 102 at a location other than the home.

In some embodiments, the process 600 may result in an adjustment of a client device setting that enhances a user experience by prioritizing features that are most used by the user. For example, the controller 126 may download a sports section of a newspaper first (or arrange this section first) because the stored data at 606 indicates that this is the content most commonly read by the user, which is determined at 604.

In some embodiments, the process 600 may implement user preferences related to operation of the client device 102 via the touch interface 224 as follows. The operation 610 may implement a palm rejection sensitivity preference based at least in part on the identity of the user. The palm rejection sensitivity may increase or decrease a size of a threshold touch imprint used to restrict inputs from the user 104 via the touch interface 224. The operation 610 may implement a pressure threshold for the touch interface 224 based at least in part on the identity of the user 104. The pressure threshold may increase or decrease a sensitivity of the touch interface 224. The operation 610 may implement a gesture speed preference based in part on the identity of the user 104. The gesture speed preference may increase or decrease a necessary input speed of a touch used to initiate a gesture via the touch interface 224. The gesture may include a command, such as page forward, page back, refresh, etc., that is initiated by a quick movement (touch) across a portion of the touch interface 224.

Figure 7:
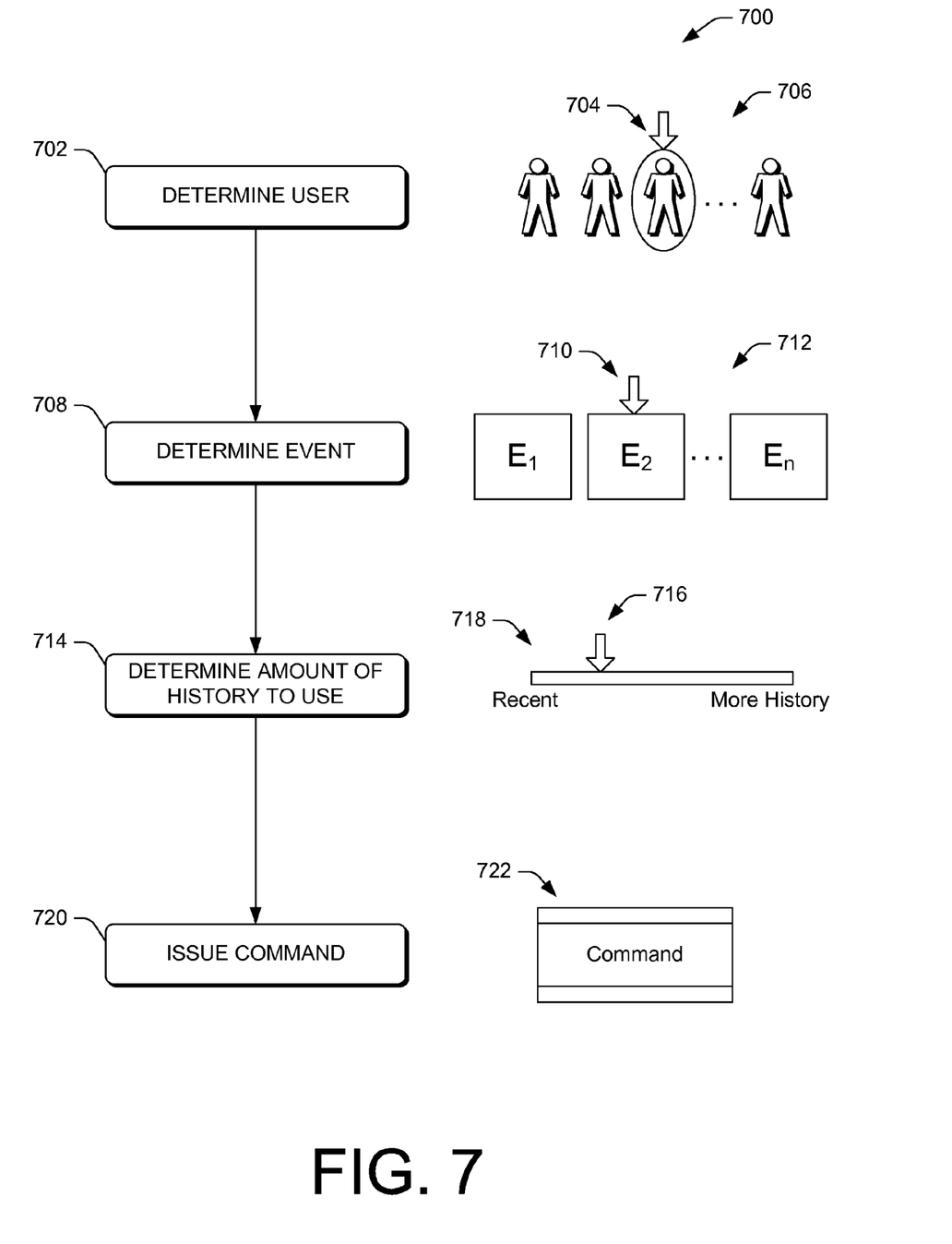
FIG. 7 is a pictorial flow diagram of an illustrative process to allocate use of the monitored data stored by the client device.

FIG. 7 is a pictorial flow diagram of an illustrative process 700 to allocate use of the monitored data stored by the client device 102. As discussed above, the event analyzer 124 may store data and perform analysis that may affect real-time operation and/or future operation of the client device 102 based on actions by the controller 126 (operational changes, etc.). In some instances, the event analyzer 124 may consider and/or weigh historical data more heavily than recent data while in some instances more recent data may be desirable and considered and/or weighed more heavily than historical data. The allocation (or weighing) of recent versus historical data is described in the process 700.

At 702, the user manager 122, possibly in conjunction with the event analyzer 124, may determine a user 704 from a group of known users 706. For example, the known users and respective data may be stored in the user data 232 for use and determination of the user 704.

At 708, the event analyzer 124 may determine an event 710 from known events 712 based on monitored data obtained by the sensors 212 and stored as the event data 234. For example, the event analyzer 124 may determine that the user is "mom" and the event is reading a magazine during the day.

At 714, the event analyzer may determine an amount of history to use when to determine whether to implement a policy, which in turn may initiate a policy for implementation by the controller 126 to alter operation of the client device 102. The event analyzer may determine a point of allocation 716 along a historical continuum 718, which indicates how much history the particular event should be based upon. For example, a user behavior may change over time, at which point the determination at 714 may tend to weigh more recent activity more heavily than historical data (which may be completely disregarded in some instances). One possible technique to determine the amount of historical data to use at 714 may use statistical analysis to determine when an occurrence of an event is a statistically significant such that it is likely to be repeated by the user (or the client device 102). For example, when the user "dad" interacts with the client device 102, he may act in a predictable manner for some actions, time, or events (e.g., same pattern on weekends, but sporadic use on weekdays, etc.). In such instances, the determination for events that are sporadic may use less or no historical data while events that have patterns and are often repeated may use more historical data (or a heavier weight) than compared to the sporadic events.

At 720, the controller 126 may issue a command 722 based on the determined event at 708 and the determined amount of history to use at 714.

To further illustrate the process 700, a non-exhaustive list of examples is discussed next. The event analyzer 124 may monitor usage of the client device 102 by the first user "mom" and determine that mom uses the device at night and usually operates the client device 102 for a long duration followed by a very long period of activity (e.g., no longer using). In such an instance, the controller 126 may rely on historical data to determine to power down the device upon a short detection of inactivity of the device in the determined event (from 708) of mom's use at night. However, mom may change behavior and begin to take short breaks during her nightly use of the client device 102, where she resumes use after a few minutes. Upon detection of a new trend, the determination at 714 may be adjusted to emphasis more recent activity and include less or no emphasis (or consideration) of the historical data.

In some embodiments, a task may require no historical data. For example, the system may determine that when the ambient noise level is very low (essentially silent) and the accelerometer 218 determines the client device 102 is laying flat (as if laying on a desk or counter and not in use), the event analyzer 124 may determine that the device is unused and may immediately power down the client device to save power. In such an instance, the historical data of such an event may be irrelevant and thus only the recent (current, real-time) data is necessary to trigger the controller 126 to power down the client device 102.

Figure 8:
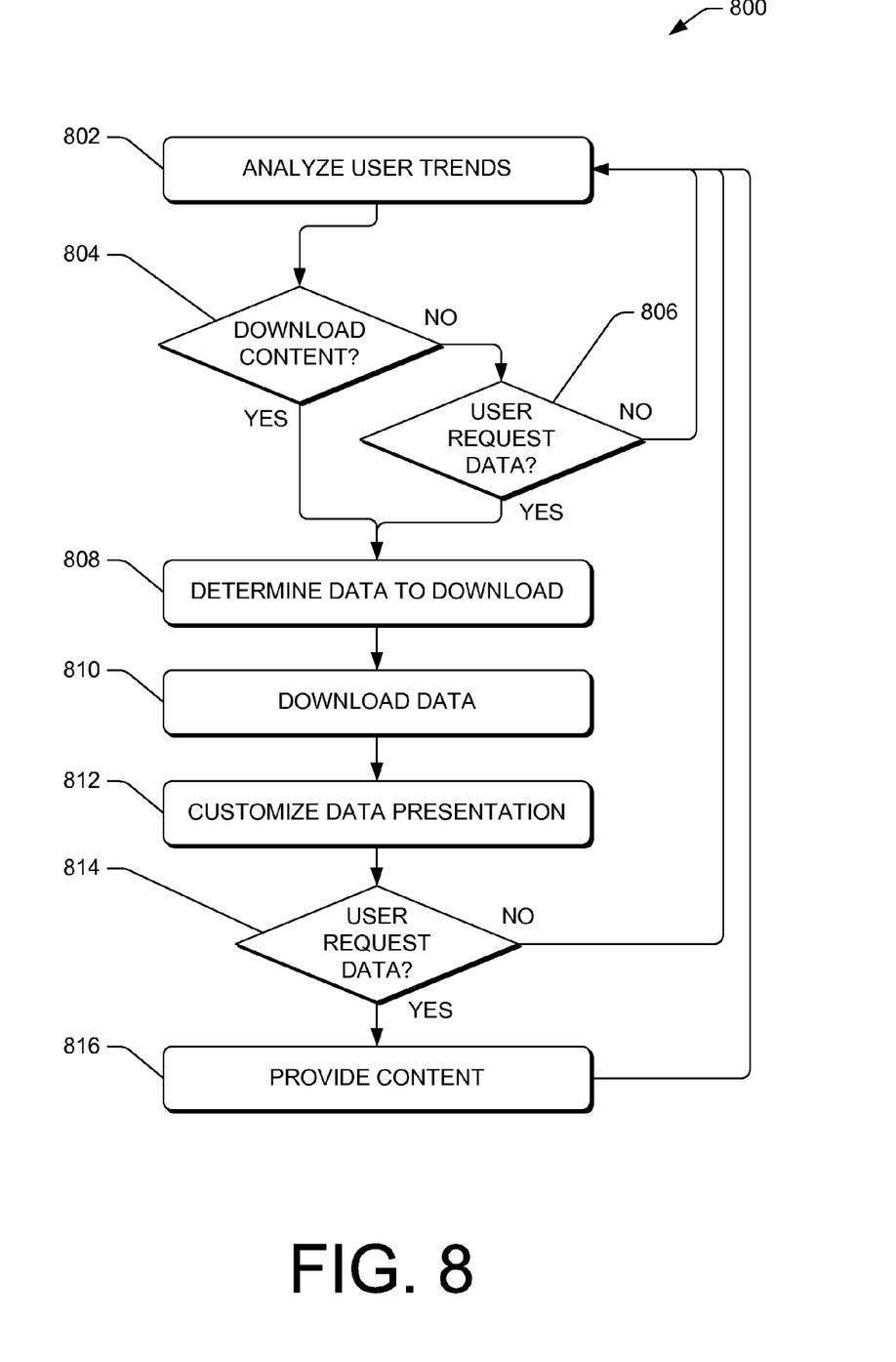
FIG. 8 is a flow diagram of an illustrative process to provide multi-source profiling to implement or reject scheduled downloads of content by a device based on an event and/or a user.

FIG. 8 is a flow diagram of an illustrative process 800 to provide multi-source profiling to implement or reject scheduled downloads of content by a device based on an event and/or a user. The process 800 is described with reference to scheduled downloading of content, such as subscription material, software updates, or other data that may be acquired by the user on a periodic or random schedule. When the client device 102 downloads information that is not useful, such as a document (e.g., newspaper, magazine, etc.) that is not read (or is unlikely to be read) or a software update for software that the user does not use, then the client device 102 may be wasting resources that may be better used for other tasks. The wasted resources may include power and network connectivity, which may include associated costs to the user and/or a provider of the content.

At 802, the event analyzer 124 may analyze user trends when interacting with the client device 102. For example, the event analyzer 124 may determine that the user "dad" primarily reads the newspaper on the weekends despite having a scheduled download of the newspaper to the client device 102 on a daily basis. Further, the event analyzer may determine that none of the users interact with a video player on the device that has regular software updates.

At 804, the controller 126 may determine whether to download content, such as the newspaper, the software update, or another scheduled download. The controller 126 may process the decision at 804 based in part on data from the event analyzer 124 obtained at the operation 802. In some instances, the controller 126 may omit a scheduled download and follow the "no" route from the decision operation 804. However, it is possible the user may then request the content despite the trends (possibly statistically significant trends), that are determined at the operation 802. If the user does not request the content at 806, ("no" route), then the event analyzer 802 may continue to analyze user trends at 802. However, if the user requests the content at 806, the process 800 follows the same or a similar processing path as when the content is determined to be downloaded at the decision operation 804 (e.g., dad's newspaper on the weekend and/or software updates for software used by the users). Thus, the decision operation 806 may be used to address anomaly situations where a prediction (no download) is incorrect at the decision operation 804, and thus reroutes the operations to follow a similar path of operations which is discussed next.

At 808, the controller 126 may determine data to download. For example, the decision from the decision operation 804 may follow the "yes" route which indicates that dad's newspaper should be downloaded because it is Saturday, a day that he reads the newspaper. The controller 126 may then download the content at 810.

At 812, the controller 126 may customize a data presentation of the downloaded content. In some embodiments, the controller 126 may present a section of a document in a preferred reading order for a particular use. For example, for the user "dad," the controller 126 may download the newspaper and place the sports section first when the event analyzer 124 determines that the user "dad" prefers to read the sports section first.

In some embodiments the controller 126 may save time by downloading only a used part of the content, which may be known based on the analysis at the operation 802. For example, when the process 800 proceeds through the decision operation 806 via the "yes" route, then at the operation 808, the controller 126 may prioritize the download to download a used part (highest priority part, etc.) for use by the user. Continuing with the example above, the controller 126 may initially obtain the sports section of the newspaper for dad in such an instance when trends (from the operation 802) indicate that he accesses this section first when reading the newspaper.

At 814, the controller 126 may determine whether the user requests the data that is downloaded, which may have been previously determined at the decision operation 806, but may be unknown when the process proceeds through the decision operation 804 via the "yes" route. When the user requests the data at the decision operation 814, the controller 126 may provide the content to the user 816. As discussed above, in some instances only part of the content may be available to the user, as least initially (e.g., the sports section) until the controller 126 can complete the downloading at 810 (e.g., via the loop through the process 800). When the user does not request the content at the decision operation 814, then the process may return to the operation 802 where the event analyzer 124 may record the user's activity, or lack thereof. Further, the event analyzer 124 may record the user's activity when the user accesses the data at 816, which may influence a decision to download the content at the decision operation 804. Thus, as discussed with reference to the cycle 300 of FIG. 3, the process 800 is also a cycle that may improve accuracy with continued use or execution of the process 800.

In accordance with various embodiments, the content downloaded by the process 800 may include electronic documents, which may include eBooks, Portable Document Files (PDF's), videos, photographs, images, Rich Internet Applications (RIA's), or other electronic content that may be downloaded by the client device 102.

Figure 9:
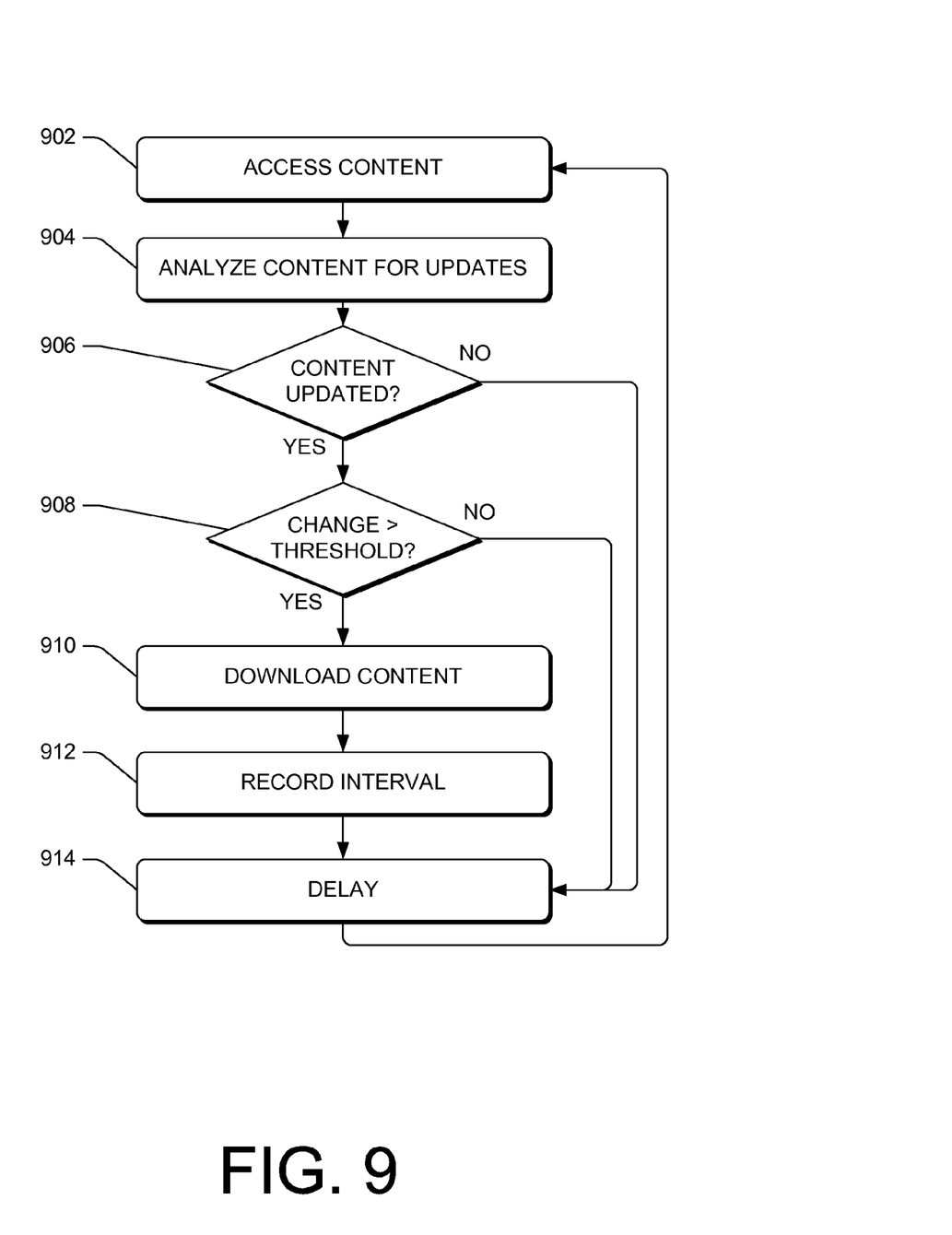
FIG. 9 is a flow diagram of an illustrative process to determine whether to download content based on updates to the content.

FIG. 9 is a flow diagram of an illustrative process 900 to determine whether to download content based on updates to the content. The process 900 may be used in conjunction with the process 800, such as when the content is not subject to a regular update schedule like a newspaper, but is instead updated at random such as a blog post, collaborative document, and so forth.

At 902, the event analyzer 124, via the content analyzer 206, may access the content, such as the content provided at the operation 816 of the process 800. At 904, content analyzer 206 may analyze the content. In various embodiments, the analysis may include comparing the accessed content from the operation 902 to previously accessed content to determine whether the content has been updated. In addition, the analysis may determine an extent of the update. In some embodiments, the content analyzer 206 may determine an amount of new content in words, characters, or other values.

At 906, the content analyzer 206 may determine whether the content has been updated based on the analysis of the operation 904. When the content has been updated, at 908, the content analyzer 206 may compare an amount of the change to a threshold value.

At 910, when the amount of the update (change) is greater than (or possibly equal to) the threshold value (e.g., number of new words, characters, etc.), then the process 900 may download the content. For example, the download at the operation 910 may be the same download operation as described with reference to the At 912, the content analyzer 206 may record an interval between a previous download of the content and the current download of the content at the operation 910. The content analyzer 206 may use this interval to determine when to access the content again at the operation 902 during a subsequent analysis, such as by adjusting a duration of a delay operation performed at 914.

When the content analyzer 206 determines that the content is not updated at the operation 906 and/or the change is less than (or possibly equal to) the threshold at the operation 908, then the process may proceed to the delay operation at 914. The process 900 may then initiate another access of the content at the operation 902 following an expiration of the delay.

In some embodiments, the process 900 may be performed in combination with the process 800 to determine when to download content based on user download activity (as discussed with reference to the process 800) and content update activity (as discussed with reference to the process 900).

Figure 10:
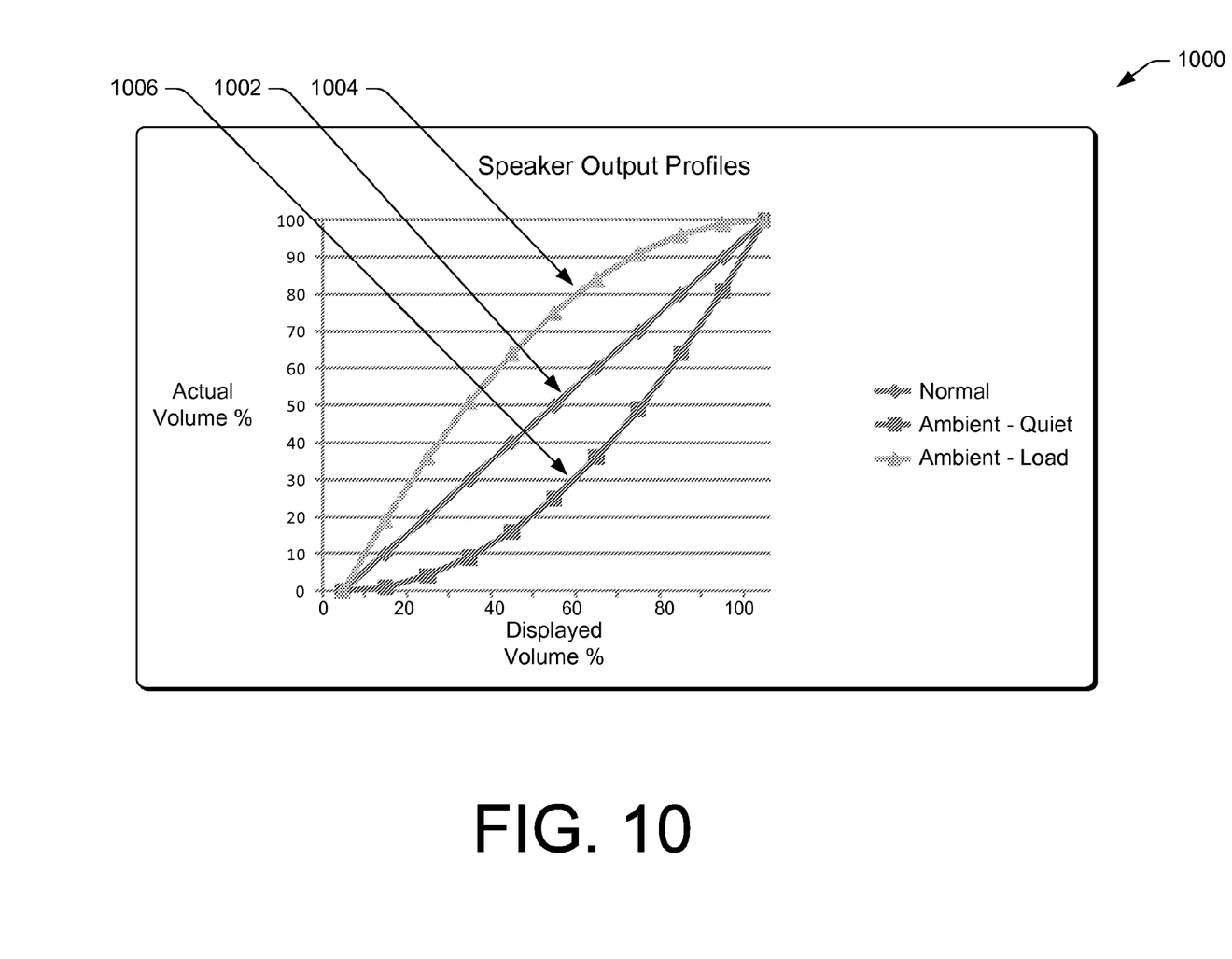
FIG. 10 is a graph of illustrative speaker output profiles that may be implemented by the client device based on the multi-source profiling to adapt to environmental conditions and/or user preferences.

FIG. 10 is a graph of illustrative speaker output profiles 1000 that may be implemented by the client device 102 based on the multi-source profiling to adapt to environmental conditions and/or user preferences.

As discussed above, the event analyzer 124 may determine a context of use of the client device 102, such as when the client device is used in a moving vehicle, late at night in a quiet environment (e.g., home), and so forth. In addition, the user manager 122 may determine the user, based in part on the data from the event analyzer 124. By using this information, the controller 126 may adjust operation of the client device 102 based on user preferences and the context (environment of use).

The profiles 1000 shown in FIG. 10 show speaker volume the correspondence between the displayed volume level (horizontally) (e.g., reported via a user interface) and the actual volume level (vertically) as measured by the output of the speakers 228.

As an example, the event analyzer 124 may determine that the client device 102 is used in a moving vehicle that has a loud background noise (as detected by the microphone 216, etc.). In response, the controller 126 may adapt the a curve associated with volume control from a normal curve 1002 to a noisy-level curve 1004 that increases the volume of the speakers more rapidly at low displayed volume levels than the normal curve 1002. Similarly, when the event analyzer 124 determines that the client device 102 is used in a very quiet environment and/or is used by a user that prefers a volume at lower settings, then the controller 126 may adapt to the quiet-level curve 1006, which may increase the volume of the speakers less rapidly at low displayed volume levels than the normal curve 1002. Although only three profiles are shown in the profiles 1000 of FIG. 10, more or fewer profiles may be used. Further, the profiles may be dynamically updated, customized, or otherwise differ based on events and/or users based on the cycle 300 discussed with reference to FIG. 3 and the process 600 of FIG. 6

In some embodiments, the event analyzer 124 may combine other sensor data, such as a vibration level sensed by the accelerometer 218 to adapt to a particular profile such as the quiet-level curve 1006 or the noisy-level curve 1004. Usage of headphones may cause the controller 126 to further adjust the curve to fit a known user preference or system preference captured by the event analyzer 124.

Although the profiles 1000 show illustrative speaker outputs, the profiles are representative of general adaptive use of the client device 102, and may be implemented in similar contexts such as to control the brightness of a screen, a font size, a back light, a touch interface sensitivity, and so forth.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that, when executed, cause one or more processors to perform acts comprising:
    identifying a content item that a user of a client device has requested to download to the client device according to a predetermined schedule that includes intervals of multiple reoccurring periods; monitoring access of the content item by the user on the client device for each interval in the multiple reoccurring periods of the predetermined schedule; determining that the user does not access the content item on the client device during at least one interval of a particular period of the multiple reoccurring periods; refraining, based at least in part on the determining, from downloading the content item to the client device during the at least one interval of another period that is subsequent to the particular period; and downloading, based at least in part on the monitoring indicating that the user has accessed the content item on the client device, a next scheduled download of the content item in a prioritized order of sections of the content item, the prioritized order of the sections based at least in part on a known user preference of the sections.

2. The one or more non-transitory computer-readable media as recited in claim 1, wherein the intervals comprise days and the multiple reoccurring periods comprise weeks.

3. The one or more non-transitory computer-readable media as recited in claim 1, further comprising downloading the content item to the client device during another interval of the particular period that is subsequent to the at least one interval of the particular period.

4. The one or more non-transitory computer-readable media as recited in claim 1, further comprising reordering sections within the content item for presentation based at least in part on the known user preference.

5. The one or more non-transitory computer-readable media as recited in claim 4, wherein the content item comprises an electronic newspaper, and the reordering includes placing a section of the electronic newspaper ahead of another section based at least in part on the known user preference.

6. The one or more non-transitory computer-readable media as recited in claim 1, wherein the content item is a subscription to an electronic newspaper or magazine.

7. A method performed at least in part by an electronic book reader device, the method comprising:
    identifying a content item that is scheduled to be periodically downloaded by the electronic book reader device after passage of an interval, a length of the interval based at least in part on a frequency of updates to the identified content item;
    analyzing the identified content item by comparing the identified content item to a previous version of the identified content item to determine whether the identified content item has been updated for each occurrence of the interval;
    determining an update has occurred when the identified content item includes at least a predetermined number or percentage of modifications since the previous version of the identified content item; and omitting a scheduled download of the identified content item for at least one interval when the identified content item has not been updated based at least in part on the analyzing the identified content item.

8. The method as recited in claim 7, further comprising monitoring use of the identified content item of the electronic book reader device for each interval.

9. The method as recited in claim 8, wherein the omitting the scheduled download of the identified content item for the at least one interval occurs when the monitored use indicates that the identified content item is not used.

10. The method as recited in claim 9, further comprising downloading a next scheduled download of the identified content item when the monitored use indicates that the identified content item is accessed.

11. The method as recited in claim 7, wherein the identified content item is downloaded by the electronic book reader device.

12. The method as recited in claim 7, wherein the identified content item is a blog posting.

13. The method as recited in claim 7, further comprising extending the length of the interval when the identified content item is not updated after a predetermined number of intervals.

14. The method as recited in claim 7, further comprising reducing the length of the interval when the identified content item is updated after each interval for a predetermined number of intervals.

15. One or more non-transitory computer-readable media storing computer-executable instructions that, when executed, cause one or more processors to perform acts comprising:
    identifying an electronic document that a user of a client device has requested to download to the client device according to a predetermined schedule that includes intervals of multiple reoccurring periods; monitoring access of the electronic document by the user on the client device for each interval in the multiple reoccurring periods of the predetermined schedule; determining that the user does not access the electronic document on the client device during at least one interval of a particular period of the multiple reoccurring periods; refraining, based at least in part on the determining, from downloading the electronic document to the client device during the at least one interval of another period that is subsequent to the particular period; and downloading, based at least in part on the monitoring indicating that the user has accessed the electronic document on the client device, a next scheduled download of the electronic document in a prioritized order of sections of the electronic document, the prioritized order of the sections based at least in part on a known user preference of the sections.

16. The one or more non-transitory computer-readable media as recited in claim 15, further comprising downloading the electronic document to the client device during an interval other than the at least one interval of the another period.

17. The one or more non-transitory computer-readable media as recited in claim 15, further comprising reordering sections of the electronic document for presentation based at least in part on the known user preference of the sections of the electronic document.

18. The one or more non-transitory computer-readable media as recited in claim 17, wherein the electronic document comprises an electronic newspaper and the reordering includes placing a section of the electronic newspaper ahead of another section based at least in part on the known user preference of the sections.

19. The one or more non-transitory computer-readable media as recited in claim 15, wherein the electronic document is a subscription to an electronic newspaper or magazine.

20. The one or more non-transitory computer-readable media as recited in claim 15, further comprising:
receiving a user request to download the electronic document for the at least one interval of the another period after the refraining; and downloading the electronic document for the at least one interval of the another period in response to the user request.

21. The one or more non-transitory computer-readable media as recited in claim 15, wherein a first section of the electronic document is accessible via the client device before a second section of the electronic document is downloaded to the client device.

22. The one or more non-transitory computer-readable media as recited in claim 21, wherein the first section is a section of the electronic document most accessed, as determined by the monitoring the access of the electronic document for each interval in the multiple reoccurring periods.

23. The one or more non-transitory computer-readable media as recited in claim 20, wherein the electronic document is a video.

24. The one or more non-transitory computer-readable media as recited in claim 15, wherein the intervals comprise days and the multiple reoccurring periods comprise weeks.

25. The one or more non-transitory computer-readable media as recited in claim 15, wherein a length of the intervals is based at least in part on a frequency of updates to the electronic document, and further comprising:
analyzing the electronic document to determine whether the electronic document has been updated for each occurrence of the intervals; and refraining from downloading the electronic document for at least one interval when the electronic document is not updated based at least in part on the analyzing the electronic document.

\* \* \* \* \*